United States Patent [19]

Boice

[11] Patent Number: 4,663,923

[45] Date of Patent: May 12, 1987

[54] SELF-PROPELLED MOWER

[75] Inventor: Richard K. Boice, Vernon Center, N.Y.

[73] Assignee: Ferris Industries, Inc., Vernon, N.Y.

[21] Appl. No.: 795,215

[22] Filed: Nov. 5, 1985

[51] Int. Cl.⁴ ............................................. A01D 34/64
[52] U.S. Cl. ...................................... 56/15.8; 56/16.2; 56/DIG. 22
[58] Field of Search ...................... 56/15.8, 15.9, 16.2, 56/208, DIG. 22, 13.6

[56] References Cited

U.S. PATENT DOCUMENTS

| | | | |
|---|---|---|---|
| 2,609,649 | 9/1952 | Watson | 56/208 |
| 2,944,377 | 7/1960 | Frieburg | 56/15.9 |
| 3,063,226 | 11/1962 | Pfauser | 56/208 |
| 4,310,997 | 1/1982 | Streicher | 56/DIG. 22 |
| 4,442,660 | 4/1984 | Kuhn | 86/DIG. 22 |
| 4,490,966 | 1/1985 | Kuhn et al. | 86/DIG. 22 |
| 4,563,019 | 1/1986 | Kuhn et al. | 56/DIG. 22 |
| 4,577,455 | 3/1986 | Amano et al. | 56/DIG. 22 |

Primary Examiner—Paul J. Hirsch
Attorney, Agent, or Firm—Bruns and Wall

[57] ABSTRACT

A self-propelled mower having a forwardly projected power unit containing a motor and mowing assembly, the deck is rotatably mounted on the axle of the machine so that the mower assembly can be raised and lowered in reference to the ground. The mower contains a riding unit mounted behind the axle. A linear actuator is secured to the riding unit that has an extendable rod which is coupled to the power unit by a pivoted link. The power unit is placed in a mowing position when the rod is extended and in an elevated position when the rod is retracted. The actuator is driven by a reversible electric motor that is controlled by a switch mounted upon the steering control of the mower so that the operator can raise and lower the mower without releasing the steering control.

9 Claims, 4 Drawing Figures

SELF-PROPELLED MOWER

BACKGROUND OF THE INVENTION

This invention relates to an improved self-propelled mower and, in particular, to a sulky-type riding mower which allows the operator to raise and lower the power deck without releasing the steering yoke of the machine.

Self-equipped, sulky-type riding mowers have been known and used in the art for some time. In this type of machine, the operator is seated upon a riding unit behind the drive axle while power related equipment, such as the motor and cutting blade assemblies, is mounted upon a power deck that extends forwardly from the axle. The power deck is normally permitted to swing freely about the axle so that it can ride over the ground upon idler wheels in response to changes in terrain. The riding unit is also pivotally attached to the power deck to further enhance the machine's ability to operate in rough or undulating terrain. The sulky-type machines found in the prior art have two disadvantages. The first involves their lack of traction when operating on relatively steep inclines or on wet or slippery surfaces. This lack of traction is generally attributed to the fact that a good deal of the machine's total weight is distributed in front of or in back of the drive axle. The second difficulty associated with this type of mower relates to problems involved with servicing the cutter assemblies which are typically mounted beneath the power deck.

In U.S. Pat. No. 4,487,046 to Scag, there is disclosed a sulky-type mower that is equipped with a hand operated winch for raising and lowering the power deck about the drive axle. The winch is situated beneath the operator's seat on the riding unit. A cable is wrapped around the winch drum and passes under an idler sheave mounted below the power deck. The end of the cable, in turn, is passed upwardly around the sheave and anchored in the deck. Winding the cable about the drum pulls the power deck around the axle to raise the cutter assembly above the ground.

In the event the Scag machine loses traction while in use, the operator can crank the power deck to an elevated position to place added weight directly over the drive axle. This, under most conditions, will increase traction to the wheels and help the operator traverse difficult sections of terrain. As can be seen, however, in order to raise the deck, the operator must release the steering yoke with at least one arm and reach under the seat to engage the crank. While in a bent over position, the operator must perform the rather arduous task of winding the crank the necessary number of turns to complete the lifting operation. If the machine is in motion, the operator can very easily lose control and have an accident. Similarly, reaching under the seat and operating the winch can unbalance the machine and may cause it to tip, particularly when it is operating upon a slope. Cranking the power deck up and down repeatedly can fatigue the operator thus impairing his ability to safely control the machine.

The Scag winching system can be used to elevate the cutting assemblies when these units have to be serviced. However, as is the case with most dependent cable systems, the cable can become frayed or damaged with use to a point where it will break when placed under load. The Scag cable is completely unprotected and thus exposed to the elements. The cable hangs down beneath the machine where it can pick up moisture and highly corrosive chemical fertilizers that are used widely on lawns, highway aprons and the like. A cable under these conditions, unless made of special materials, can rapidly corrode thus increasing the danger of its breaking when placed under load.

Lastly, in order to allow the power deck to move freely up and down as it moves over the ground, the Scag cable is slackened when not actually lifting the deck. This unwanted slack can foul on foreign objects, such as sticks and branches passing beneath the machine, thus rendering the winch inoperative. The slackened cable can also, under certain conditions, move off the idler sheave again adversely effecting the operation of the winch. The operator must stop the machine and dismount in order to clear the winch mechanism which, of course, wastes a good deal of time and effort.

SUMMARY OF THE INVENTION

It is an object of the present invention to improve self-propelled riding mowers.

It is a further object of the present invention to provide a sulky-type riding mower wherein the operator can raise and lower the power deck unit of the machine while the machine is in motion without having to release the steering controls or moving to a position that would unbalance the machine.

Another object of the present invention is to improve the safety of a sulky-type riding mower.

A still further object of the present invention is to provide an automatic mechanism for raising and lowering the power deck of a sulky-type mower which is not susceptible to corrosion or the like.

Yet another object of the present invention is to eliminate the use of cables to lift the power deck of a riding mower.

These and other objects of the present invention are attained by means of a sulky-type mower in which a rearwardly disposed riding unit is pivotally connected to a forwardly disposed power deck unit containing the motor and mowing blade assembly. The power deck is pivotally mounted upon the drive axle of the machine so that it can be raised between a first mowing position and a second elevated position. A linear actuator having an extendable rod is mounted on the riding unit and the rod is attached to the power deck by a pivoted link. When the rod is extended, the link is angularly displaced in reference to the axis of the rod to permit the power deck to swing freely about the axle in response to changes in terrain. Retracting the rod, however, pulls the power deck back about the axle thereby raising the mowing blade assembly to an elevated position. The operation of the linear actuator is controlled by a switch mounted upon the steering control of the machine so that the operator does not have to release the controls when raising or lowering the power deck.

BRIEF DESCRIPTION OF THE DRAWINGS

For a better understanding of these and other objects of the present invention, reference is had to the following detailed description of the invention which is to be read in conjunction with the accompanying drawings, wherein.

DESCRIPTION OF THE INVENTION

Figure 1:
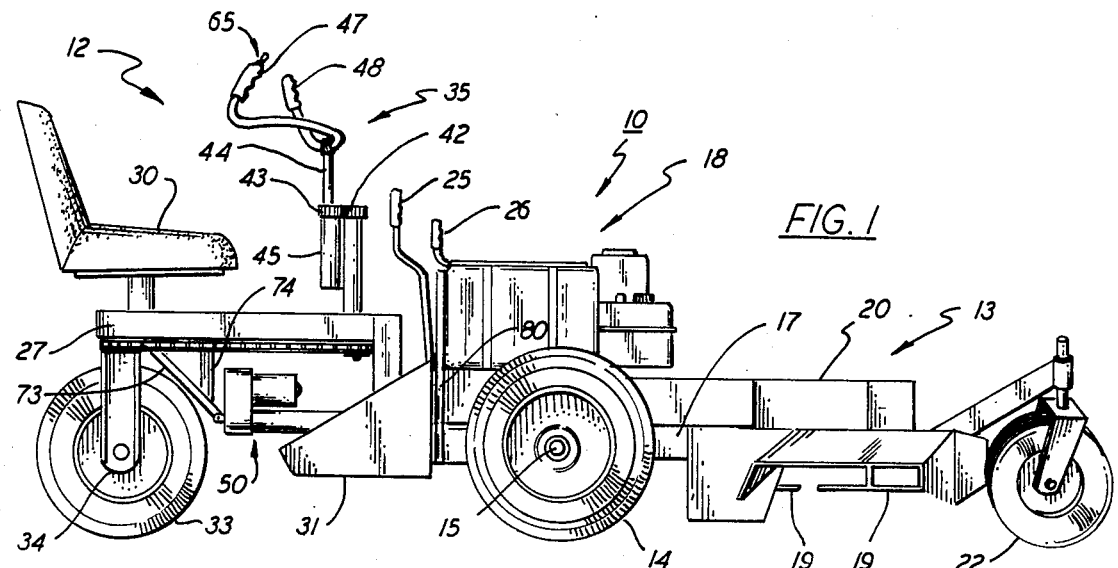
FIG. 1 is a side elevation of a sulky-type riding mower embodying the teachings of the present invention.

Referring initially to FIG. 1, there is shown a sulky-type, self-propelled riding mower, generally referenced 10, that embodies the teachings of the present invention. The mower contains two main sections that include a rear riding unit 12 and a forward power deck unit 13. A pair of drive wheels 14—14 are rotatably supported by an axle 15 mounted in the back of the power deck chassis 17. Suitable bearing means are provided so that the deck is able to swing freely about the axle. As the name implies, the power deck supports the machines power related equipment and includes a motor 18 directly over the drive axle and a series of rotary cutting blades 19—19 beneath the deck well forward of the drive axle. The motor in this case is an internal combustion engine which is operatively connected by suitable drive means (not shown) to both the drive axle and to the drive components of the blade assembly. The blade drive components typically involve belt and pulley drives which are enclosed in a housing 20 mounted on the top of the deck.

Figure 2:
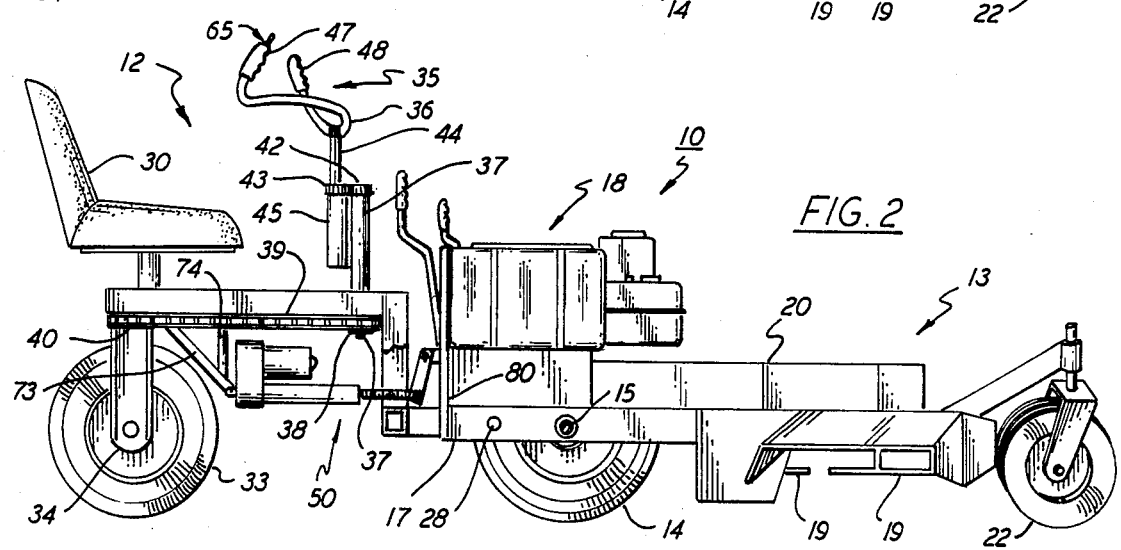
FIG. 2 is a side elevation of the mower shown in FIG. 1 with portions broken away to better show the apparatus for raising and lowering the power deck showing the deck in a mowing position.

A pair of idler wheels 22 are mounted at the front of the power deck and are adapted to run over the ground when the deck is placed in a mowing position as shown in FIGS. 1 and 2. As will be explained in greater detail below, the deck is allowed to freely rotate about the axle when in the mowing position so that the wheels are able to follow the contour of the ground as the mower moves over the sloping terrain. Levers 25 and 26 relating to the operation of various power related components are mounted at the back of the power deck where they can be easily reached by an operator seated on the riding unit 12.

The riding unit is equipped with a rigid frame 27 that is supported in the back of the deck by means of a hinge pin 28 (FIG. 2). The pivot is placed as close as possible to the axle so that the two co-joined front and rear units can rotate independently. Alternatively, where room permits, both the power unit and the riding unit can be rotatably joined to the axle.

A seat 30 is mounted at the top rear of the riding unit frame 27 and an opposed pair of stirrups 31 are mounted on either side of the frame so that the operator can be safely and comfortably mounted astride the riding unit. A single pilot wheel 33 is mounted within a bifurcated steering bracket 34 below the rear section of the riding frame. The bracket is journalled for rotation in the frame so the pilot wheel turns about the vertical axis of the bracket to direct the machine over the ground. A steering control 35 that includes a hand held yoke 36 is connected to the pilot wheel so that the wheel turns in the same direction as the yoke. The steering control includes a vertical steering column that rotatably contains a shaft 37. The lower end of the shaft passes through the frame and engages a drive sprocket 38 of an endless chain 39. The opposite end of the chain is trained around an idler sprocket 40 secured to the bracket of the pilot wheel. The upper end of the shaft is equipped with a gear 42 that meshes with a similar gear 43 secured to the shank 44 of the steering yoke 36. The shank is rotatably supported within a cylindrical bearing housing 45 welded to the steering column. The yoke is provided with a pair of rearwardly directed hand grips 47 and 48 that can be easily grasped by an operator seated upon the riding unit.

As should now be evident, the steering control of the present invention provides a positive acting mechanism that is capable of delivering rapid response to any desired change in direction. Furthermore, through the use of the gear and chain and sprocket transmission system, the use of objectionable cables is further avoided.

Figure 3:
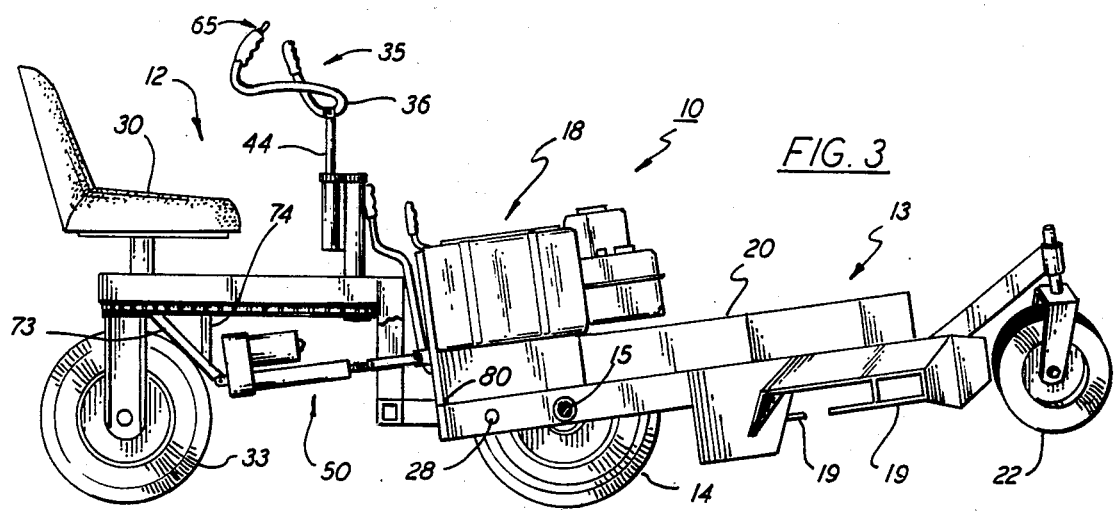
FIG. 3 is also a side elevation similar to that in FIG. 2 showing the power deck of the mower in an elevated position.
Figure 4:
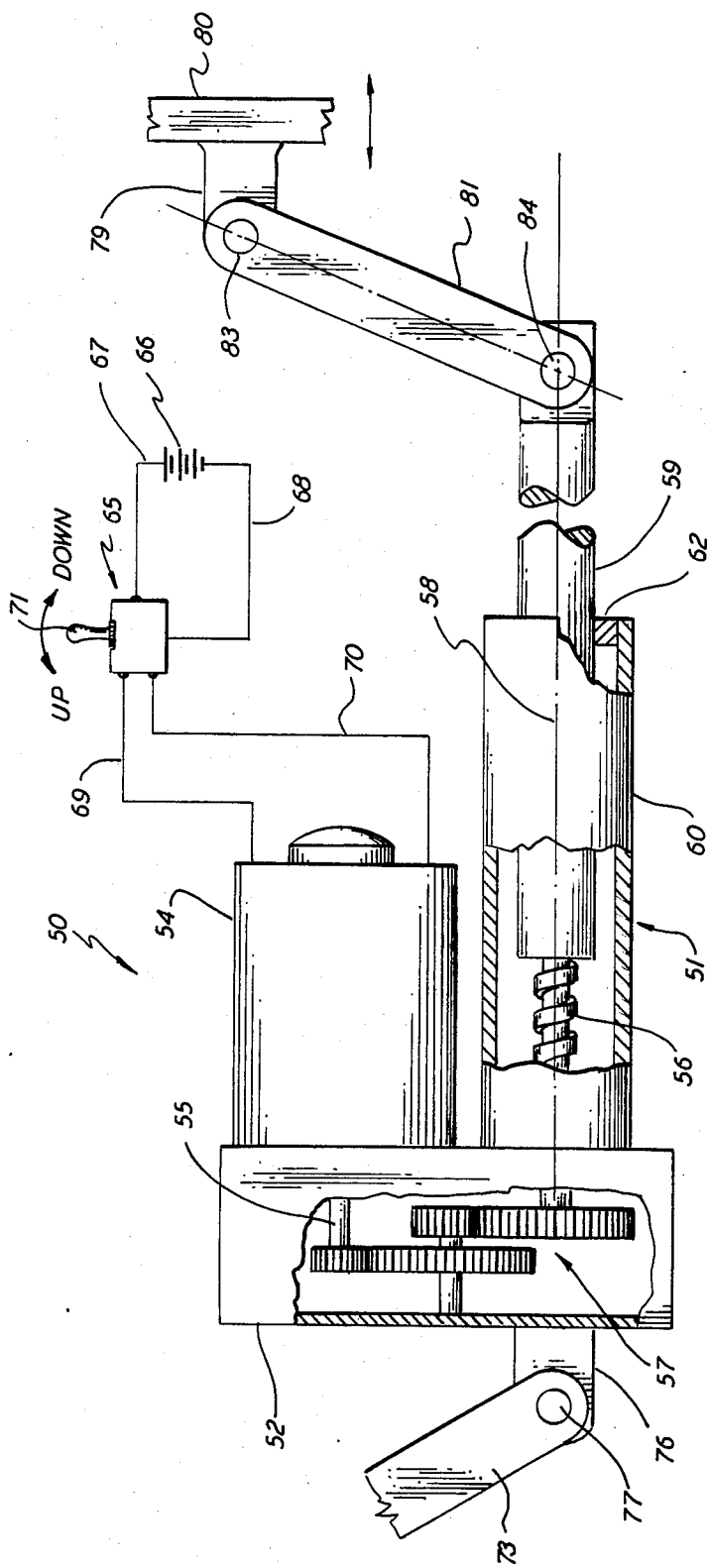
FIG. 4 is an enlarged partial view of a linear actuator used to raise and lower the power deck.

Turning now more specifically to FIGS. 2-4, there is shown apparatus 50 for raising and lowering the power deck about the drive axle of the machine. The apparatus includes a linear actuator 51 that is attached to a gear housing 52. A reversible electric motor 54 is also attached to the gear housing immediately above the actuator. The motor shaft 55 is coupled to a square tooth lead screw 56 of the actuator via an appropriate step down gear train 57 contained in the gear housing. Although not shown, the lead screw is journalled for rotation in the housing so that it turns about the axis 58 of an extendable rod 59 slidably contained within the actuator cylinder 60. The lead screw is threaded into the rod so that the rod is extended when the lead screw turns in one direction and is retracted when it turns in the opposite direction. A seal 62 is mounted in the distal end of the cylinder which serves to prevent dust, dirt and moisture from entering the cylinder.

The operation of the reversible motor is controlled by means of a three position switch 65 which is mounted on one of the handles of the steering yoke so that it can be manipulated by the operator without having to release his grip on the steering mechanism. The switch is connected to the twelve volt power supply 66 of the mower via leads 67 and 68 and to the motor windings via leads 69 and 70. The switch contains a finger actuated toggle 71 that is normally biased in a neutral position wherein no current is flowing between the power supply and the motor. Depressing the toggle in one direction connects the motor winding to the power supply so that current flows in one direction. Depressing the toggle in the opposite direction reverses the polarity of the connection to the windings causing current to flow in the opposite direction. As can be seen, through use of the switch, the direction of rotation of the motor can be selectively controlled by the operator.

Although the switch is shown mounted on the steering yoke in this embodiment of the invention, the switch can be mounted at any convenient location where it may be easily reached by the operator without having to change his position upon the riding unit or impairing his ability to control the machine.

A stationary bracket made up of an elongated member 73 and a reinforcing member 74 is welded to the bottom of the riding unit frame. The member 73 is pivotally joined to a connector 76 secured to the back of the gear housing means by a pin 77 so that the actuator can swing up and down in a vertical plane about the pin. The distal end of the extendable actuator rod is coupled to a connector 79 welded to a vertical post 80 on the power deck by a link 81. The link is joined at each end to the deck connector and to the extendable actuator rod by pivots 83 and 84.

When the power deck is in a mowing position, as shown in FIG. 2, the idler wheels are in contact with the ground and the actuator rod is in a fully extended position. At this time, the link 81 is positioned at some angle with regard to the axis 58 of the rod so that the link can rotate freely about pin 84. Accordingly, the link will provide sufficient flexibility through the coupling to allow the power deck to reposition itself about the drive axle so that it can follow the contour of the ground without binding the linear actuator.

In the event the operator, for whatever reason, wishes to raise the front of the power deck, he simply has to depress the toggle switch in the appropriate direction whereupon the motor will turn in a direction to retract the actuator rod. The rod, as it is pulled back, will draw the link in alignment with the axis 58 of the rod whereupon further retraction of the rod causes the power deck to be pulled back about the axle, as shown in FIG. 3, thereby elevating the blade assemblies. The entire actuator assembly, being pivotally mounted in the riding unit continues to turn in response to the movement of the deck so that the rod and link remain in coaxial alignment as the front of the deck is being raised. The rod is afforded sufficient linear travel to raise the deck to an elevation whereby a preponderance of its total weight is now being supported by the drive axle thereby considerably increasing the amount of traction afforded the drive wheels. Similarly, sufficient clearance is furnished between the blade assemblies and the ground to permit ready access to the blades and their associated drive components so that they can be serviced without the need of special lifting devices or tools.

The electrical motor, when not actuated, acts as a brake to prevent the lead screw from turning. When the deck is brought to an elevated position, as shown in FIG. 3, the rod places an axially directed force upon the screw which further acts to prevent the screw from turning when the deck is elevated. Accordingly, any time the deck is elevated there is little danger that it will fall back into a mowing position even if the motor is shut down.

Although an electrically driven actuator is herein disclosed, it should be clear that the actuator can be driven pneumatically, hydraulically or by any other suitable means without departing from the teachings of the present invention. As should be evident from the disclosure above, the lifting apparatus of the present invention can be operated by the rider while the machine is in motion without the rider having to release the steering control or having to alter his position on the sulky. It should be further noted that the present lifting apparatus is not susceptible to fouling, damage or corrosion as are cable actuated devices found in the prior art. As a consequence, the apparatus of the present machine is safer and more reliable than any similar presently available machines.

While this invention has been described with reference to the structure disclosed herein, it is not confined to the details set forth and this application is intended to cover any modifications or changes as may come within the scope of the following claims.

I claim:

1. A self-propelled lawn mower that includes
a power unit having a deck for supporting a drive motor and a mowing means,
a pair of drive wheels supported upon an axle at the back of the deck and at least one idler wheel mounted on the front of the deck, said deck being rotatable about said axle between a first mowing position wherein the idler wheel rides upon the ground and a second elevated position wherein the idler wheel is raised above the ground whereby substantially the entire weight of the deck is carried by the axle,
a riding unit having a frame pivotally attached at its front end to the back of the deck, said riding unit further including a pilot wheel movably mounted in the frame for directing the mower over the ground,
a linear actuator pivotally supported at one end in the frame and having an extendable rod reciprocally mounted therein for moving the deck between said first and second positions,
a link pivotally connected at one end to said actuator rod and at the other end to said deck so that the link is angularly offset in relation to the linear rod when the deck is in said first position, whereby the deck is free to rotate about the axle in response to changes in terrain, and is axially aligned with the rod when the deck is moved to said second elevated position, and
means for controlling the linear actuator to extend and retract the rod whereby the deck is selectively moved between the first and second positions.

2. The mower of claim 1 wherein said linear actuator includes a reversible electrical motor that is connected to the rod by a lead screw.

3. The mower of claim 2 wherein said means to control the actuator is a switch means for electrically connecting the motor to a power supply.

4. The mower of claim 3 wherein said switch means is mounted on a hand-held steering control connected to the pilot wheel whereby an operator seated on the frame can raise and lower the deck without releasing the steering wheel.

5. The mower of claim 4 wherein the steering control includes a steering yoke that is connected to the pilot wheel by a pair of meshing gears and an endless chain whereby the pilot wheel turns in the same direction as the steering yoke.

6. The mower of claim 1 wherein the drive motor is mounted upon the deck directly over the axle and is connected to the drive wheels.

7. The mower of claim 6 wherein the mower means includes at least one movable cutting blade that is mounted beneath the deck forward of the axle and which is connected to the drive motor.

8. The mower of claim 1 wherein said link is attached to the deck at a point above the axle whereby the deck is pulled into the second elevated position when the rod is retracted by the linear actuator.

9. The mower of claim 2 wherein said motor contains a brake means for holding the rod in a fixed position when the motor is inactivated.

* * * * *